(12) United States Patent
Goodart et al.

(10) Patent No.: US 8,504,457 B1
(45) Date of Patent: Aug. 6, 2013

(54) DYNAMIC ELECTRONIC INSURANCE POLICY BRANDING AND ASSOCIATED DELIVERY DOCUMENTS-DISPLAYED VIA THE WEB/INTERNET TO VARIOUS PARTICIPANTS IN THE DISTRIBUTION CHAIN FROM THE INSURANCE MANUFACTURE THROUGH WHOLESALE BROKERAGE CHANNELS, RETAIL INSURANCE AGENT AND THE POLICY APPLICANT

(75) Inventors: Roy A. Goodart, Salt Lake City, UT (US); Greg S. Reynolds, Salt Lake City, UT (US)

(73) Assignee: Aplifi, Inc., Pompano Beach, FL (US)

( * ) Notice: Subject to any disclaimer, the term of this patent is extended or adjusted under 35 U.S.C. 154(b) by 180 days.

(21) Appl. No.: 12/965,871

(22) Filed: Dec. 11, 2010

Related U.S. Application Data

(60) Provisional application No. 61/283,942, filed on Dec. 11, 2009.

(51) Int. Cl.
*G06Q 40/00* (2006.01)

(52) U.S. Cl.
USPC .................................................. 705/35; 705/4

(58) Field of Classification Search
USPC ................................................ 705/4, 35–40
See application file for complete search history.

(56) References Cited

U.S. PATENT DOCUMENTS

2008/0126513 A1* 5/2008 Bouchard et al. ............. 709/217

* cited by examiner

*Primary Examiner* — Thu Thao Havan
(74) *Attorney, Agent, or Firm* — Daniel S. Polley, P.A.

(57) ABSTRACT

A software based process which includes marketing and additional documents created dynamically from templates specific to the audience reviewing and approving the policy package for further distribution, and in one non-limiting example eventually reaching the insured. In non-limiting examples, a typical distribution chain could include (1) an Insurance Provider (Carrier) to Wholesale Brokerage Agency or Broker to an Agent or Retail Agency to an Insured; (2) Insurance Provider (Carrier) to an Insured; or (3) Insurance Provider (Carrier) to a Direct Marketer to an Insured or any combination of the above.

46 Claims, 10 Drawing Sheets

Sample Rule Building Screen

1- Rules are built for unlimited set of scenarios
   a. Sample data elements include
      i. Insurance company
      ii. Agency
      iii. Producer
      iv. Product type
      v. Premium
      vi. Routing preferences
      vii. View base security to view certain documents but not others
      viii. What aspects of the branding to apply to which scenario
         1. What catalog details to display
         2. What ads to display
         3. What logos to display
         4. What demographic details to display for all parties

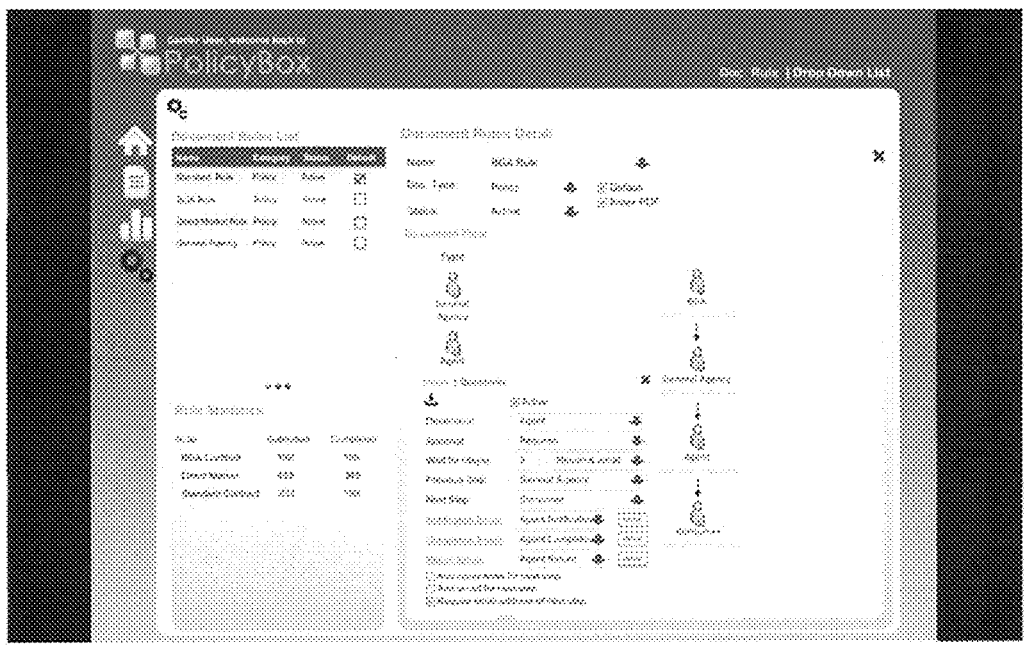

Figure 4

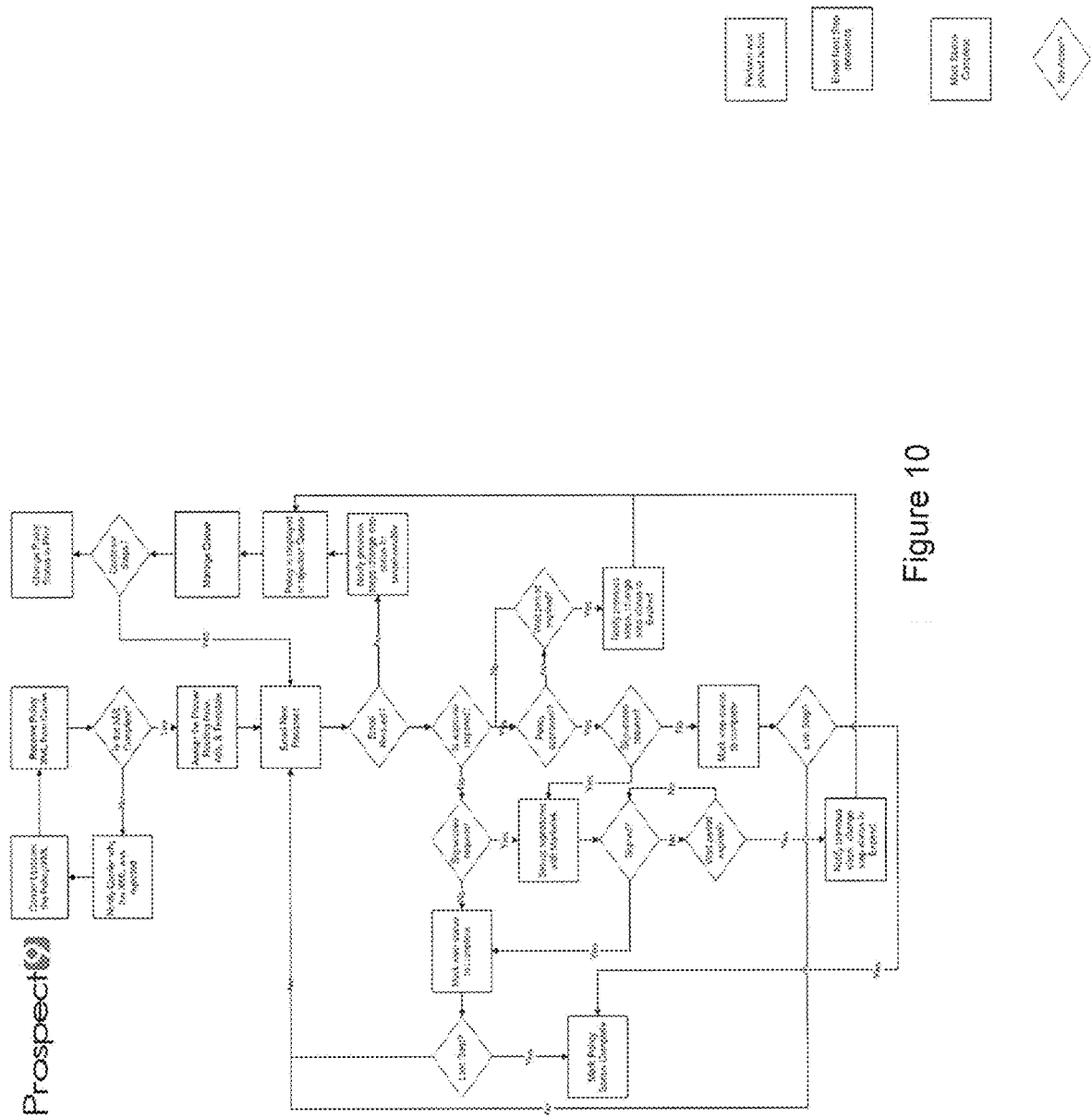

DYNAMIC ELECTRONIC INSURANCE POLICY BRANDING AND ASSOCIATED DELIVERY DOCUMENTS-DISPLAYED VIA THE WEB/INTERNET TO VARIOUS PARTICIPANTS IN THE DISTRIBUTION CHAIN FROM THE INSURANCE MANUFACTURE THROUGH WHOLESALE BROKERAGE CHANNELS, RETAIL INSURANCE AGENT AND THE POLICY APPLICANT

This application claims priority to U.S. Application Ser. No. 61/283,942, filed Dec. 11, 2009, which application is incorporated by reference in its entirety.

FIELD OF THE INVENTION

The present invention generally relates to data processing and the display of documents and associated web pages, and more particularly to dynamically branding, preferably for the purposes of marketing and name recognition, the display of Insurance policies and related insurance documents based on a set of rules designed by the using party.

BACKGROUND OF THE INVENTION

Insurance Carriers price and underwrite the risk for millions of insureds. Since the beginning of this practice, paper has been used by the Insurers to convey the terms and conditions within an agreement, which is typically referred to as a Policy. The Policy can be one page or it can be several hundred pages depending on the complexity of the agreement. Insurance providers have recently started to electronically produce these Policies for distribution directly to the insured.

Traditionally insurance documents are delivered by mail to the end consumer in paper format. There are many steps to the process and generally involves multiple parties. Each party in the process adds additional information to their downstream, which includes marketing and other communication, to the paper packet prior to the last step that is received by the consumer.

Today technology has allowed for the delivery of documents by electronic means. However, the documents are usually in a simple image form and create a disconnection between all of the parties. Accordingly, in this field there is a need for a system or mechanism that can allow each party in the process to perform electronically what they would normally perform through a traditional paper workflow.

There is a particular need for a system or mechanism that would allow each party in the value chain to have a way to dynamically brand the documents and views of the web pages based on a set of preset rules assigned by the user that is associated with the documents and other demographic details. This need extends to the ability to associate words, terms, and editorial matter appearing in the content of the document, with the document index.

SUMMARY OF THE INVENTION

The foregoing needs, and other needs and objects that will become apparent from the following disclosure, are fulfilled by the present invention, which comprises, in one general aspect, a computer or electronic based method of dynamically creating, web based, views for each user in the value chain based on their role of which these views will be determined by a set of system rules in combination with keywords, tags, and other content related to the document(s) or other associated information accompanying the document via data feeds from their parties or that is extrapolated from other sources.

One feature of this aspect is that the step of selecting how and what to brand, may, include steps of receiving data that indicates one or more tags and criteria to be used to determine which set of documents should display dynamic headers, graphics, and or key hyperlink(s) to varying other documents, systems, or areas of internal or external systems. Another feature of this aspect is that the dynamics of the branding can be preferably different for each participant in the value chain with endless combinations.

In still another feature details relating to the demographics of the user, value chain, or consumer may be received via data transmission from a third party, or entered manually, the associated formatting rules based on tags or index can dynamically build the display and associated branding, ads, links, or other associations.

A further aspect of the invention provides a method of restricting access to an electronic document(s) that are stored among a plurality of documents, the method comprising the steps of storing a tag, set or role based rights with an index association with information identifying the electronic document(s) and display, in which that tag and index in combination with the role indicates access or restrictions.

Still yet another feature of this invention involves a method of constructing an index of electronic documents for use of selecting which branding aspects should be applied to the user's dynamic display. This can entail indexing and tagging associated documents and users with the insurance company, agency, producer, end consumer, insurance or investment product, policy and purchase details, and other demographic, consumer, or company related details. These values may or may not be derived by the documents themselves but may include external data elements provided in data feeds by internal or external parties.

An even further aspect of the invention is a method of selecting electronic documents from a plurality of documents to display dynamic header tags to provide clarity and indexing for the user. These header tags will allow all of the documents to be displayed as a single document and provide easy retrieval and viewing for the end user The foregoing summary is not intended to describe or summarize all features or aspects of the invention.

BRIEF DESCRIPTION OF DRAWINGS

FIGS. 4 through 7 are screen designs showing real world application and non-limiting examples of use in accordance with the present invention. The screen shots in FIGS. 4 through 7 are intended for example purposes only and may vary from end product use. The screen shots illustrate one non-limiting use of the invention;

FIG. 10 is a more detailed process flow diagram of the preferred steps in accordance with the present invention.

DETAILED DESCRIPTION OF THE INVENTION

As will be described in more detail below the present invention provides a software or computer based process which provides marketing and additional documents that can be created dynamically from templates specific to the audience reviewing and approving the policy package for further distribution. When used in the insurance industry, in one example the end recipient of the documents can be an insured. With use of the present invention a typical distribution chain can include the following (1) an Insurance Provider (Carrier) to a Wholesale Brokerage Agency or Broker to an Agent or Retail Agency and ultimately to an Insured; (2) an Insurance Provider (Carrier) to an Insured; and/or (3) Insurance Provider (Carrier) to a Direct Marketer to an Insured. Any combination of the above can also be used and are considered within the scope of the invention.

Figure 9:
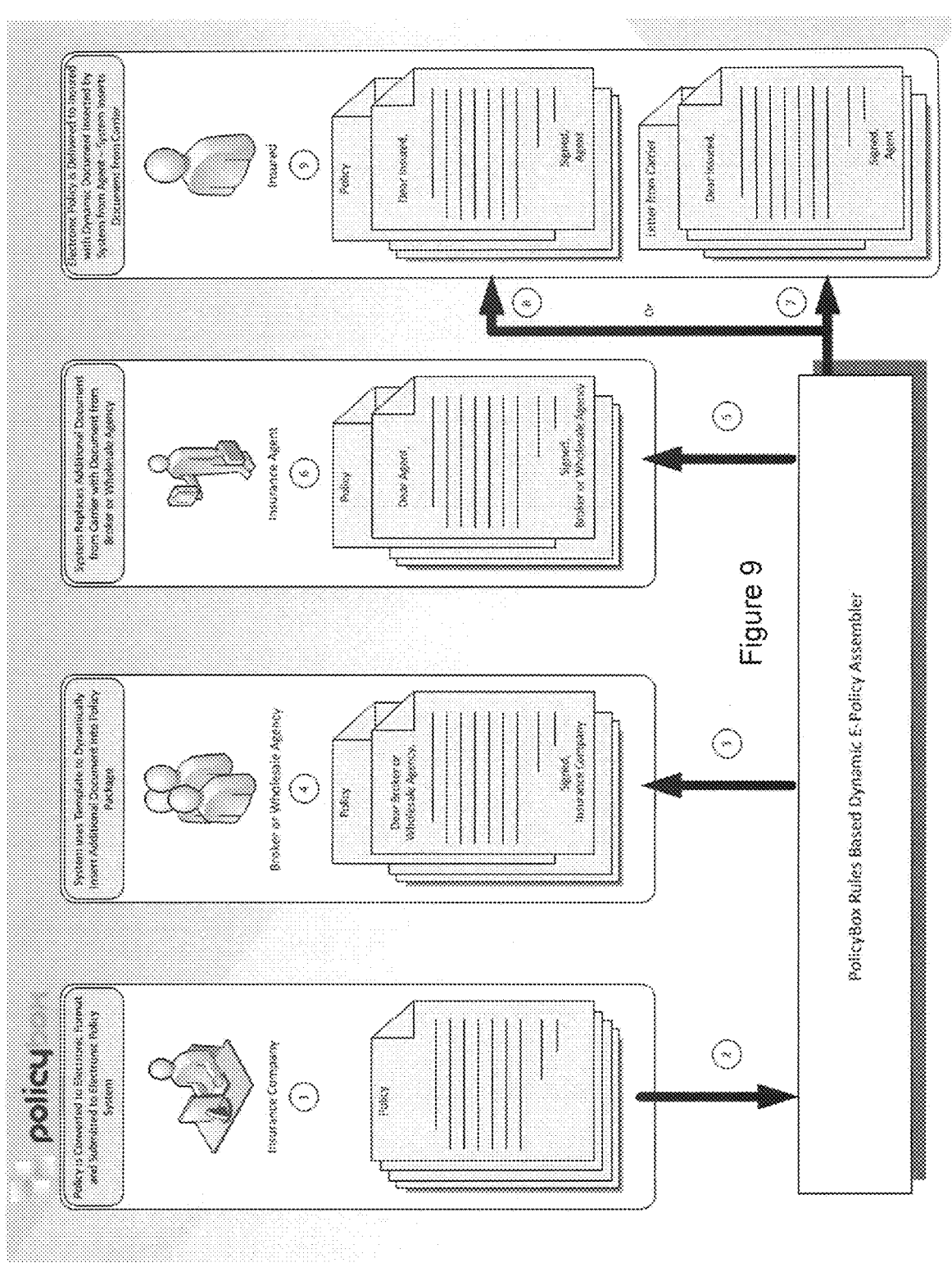
FIG. 9 is a process flow diagram of the preferred main general steps in accordance with the present invention.

Referring to FIG. 9 the relevant Insurance Policy or other document is preferably converted into an electronic format and preferably submitted or otherwise provided to the electronic policy system of the present invention. In one non-limiting embodiment, at step 1 the Insurance Provider electronically or manually uploads an electronic version of a Policy with associated data about the approving or reviewing parties, data about the insured and any other necessary data to drive business rules about the delivery of an electronic document package through the distribution chain to the end Policy Owner.

At step 2 the Policy and Data can be preferably submitted within a predefined format (XML or other) to the present invention system ("System"). The System can preferably build a delivery schedule which includes, but is not limited to, all parties that either need to review and/or approve. They System will generate and combine with the Policy package any marketing (which can include, without limitation, introductory letters, thank you letters, documents requesting further information for future marketing capabilities, marketing brochures, similar documents, etc.) Predefined or stored rules ("Rules") within the system determine which documents are dynamically included within the policy package and what order they appear to their respective audience. The Rules also determine which documents are intended for the right party to review.

At step 3, with the Insurance example, the System can preferably send a Wholesale Brokerage Agency and/or Broker an alert that a Policy package is ready for their approval or review. After they preferably authenticate with the system they can be provided a queue to review policy packages. Within this Policy Package can be preferably a dynamically created thank you letter from the Carrier and instructions about face amount accuracy review. At this point, the Policy Package can be preferably virtually bound with a Carrier branded cover page.

At step 4 the Wholesale Brokerage Agency and/or Broker can review the policy, can read the dynamically prepared template letter from the Carrier and can either "approve" or "reject" the Policy Package. If the Policy is "rejected" the Policy gets sent back to the Carrier for corrections (preferably automatically by the system) and then can preferably reenter the electronic policy delivery process from the beginning. If the policy package is "accepted" an alert via email, SMS text or other electronic message is sent to the agent by the system (preferably automatically by the system) for approval or review.

At step 5 the system preferably can send an alert via Email, SMS text or other electronic message is sent to Agent alerting that a policy package is ready for review. The system dynamically and virtually assembles the policy package with a new cover (this time with the Wholesale Brokerage Agency and/or Broker's branding) and any additional documents—letter to the Agent from the Wholesale Brokerage Agency or Broker, document form requesting additional information from the Agent for future marketing or marketing brochure, etc.

At step 6 the Agent can preferably click on a link in the Email, SMS message or other electronic message and authenticates their identity with the system. Once authenticated the agent may then view the policy package, read the marketing and create an additional document or documents for inclusion in the policy package to their client (i.e. the end insured) etc. Through the system the agent may also replace the cover binding with a template or document which includes their own branding—logo, colors, design etc.

At step 7 the system generates the final Electronic Policy Package with the proper cover binding (based on rules the document originator sets forth). Though not considered limiting the rules can be designed such that the insured always sees a cover sheet with the Insurance Carriers branding, logo etc. on it. Alternatively, as seen at step 8 the carrier may allow the Agent to use their own template, logo, design etc. including an additional document from the agent or carrier or both (e.g. welcome letters, product marketing, brochures, or forms collecting data for future marketing purposes, etc. though not considered limiting).

At step 9 the end recipient (i.e. insured, etc.) electronically receives an alert from the system instructing them to click on a preferably one-time use URL (or other link) which directs the end recipient to a consumer portal within the system, preferably authenticates their identity and allows them to review their custom built electronic policy package. At this point the electronic policy package can include, without limitation, a cover sheet and/or additional documents including letters, product marketing, brochures, or forms collecting data for future marketing purposes. The Insured can approve the policy and accepts the coverage if necessary with an electronic signature completing the process.

As a non-limiting example for the operation of the present invention an Insurance Carrier may want to create a template letter to the first reviewing party, which can be, but is not limited to the Wholesale Brokerage Agency or Broker. This letter can thank the Wholesale Brokerage Agency or Broker for their business and highlight areas of the policy to verify or review. After the first approving or reviewing party has assessed that the package is correct and ready to distribute, they will approve the package and the rules within the system would send an alert to the next approving or reviewing party. In this example, the Agent can be the next party and the system would replace the previously mentioned letter from the Carrier to the Wholesale Brokerage Agency or Broker with a thank-you letter from the Wholesale Brokerage Agency to the Agent. This letter (also referred to as an additional document) is dynamically created by the system specific for the Agent on behalf of the Wholesale Brokerage Agency or Broker. This same treatment can be repeated for as many parties who participate within the approval or review process of a policy package before the Insured receives the notification that their policy is ready for delivery. The Insured, based on a link from the electronic notification from the system that their policy is ready to be collected, preferably goes to a unique URL, enters data to authenticate their identity and are allowed to view the electronic policy package. Within this package includes dynamic documents, based on rules and templates, introducing the Insured to their policy and can also include a "thank you" note from their Agent and Insurance Carrier.

FIG. 4 illustrates a sample rule building screen in accordance with the present invention. The Rules can be built for an unlimited amount or set of scenarios. Non-limiting sample data elements can include one or more of the following: (i) Insurance company; (ii) Agency; (iii) Producer; (iv) Product type; (v) Premium; (vi) Routing preferences; (vii) View base security to view certain documents but not others; (viii) What aspects of the branding to apply to which scenario (such as, but not limited to, what catalog details to display, what ads to display, what logos to display and/or what demographic details to display for all parties.

Figure 1:
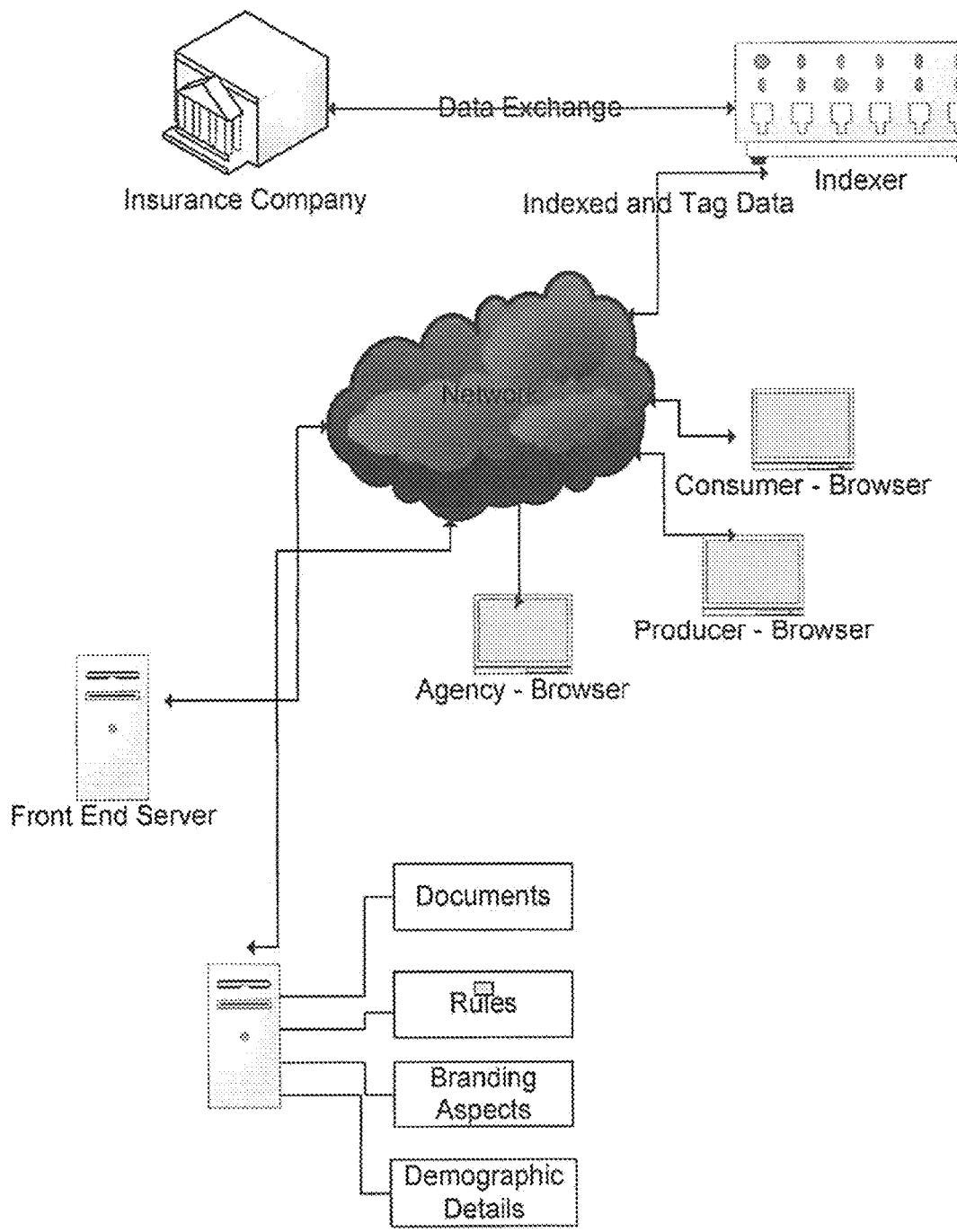
FIG. 1 is a block diagram of a data exchange model whereby the data and documents passed from the insurance company are index and tagged—associated processing and display in accordance with an embodiment of the present invention.
Figure 2:
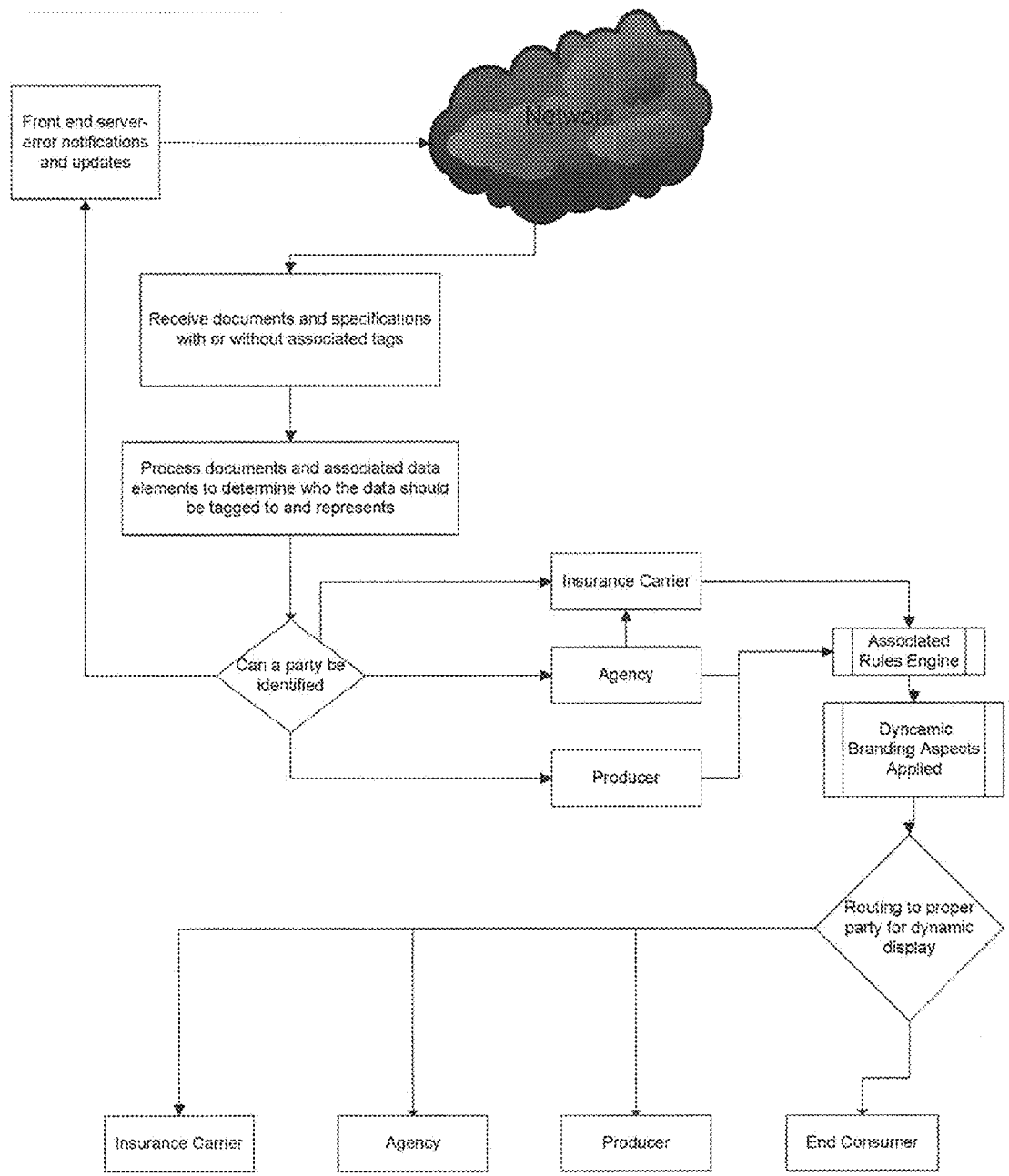
FIG. 2 is a block diagram displaying the routing, identification, association of rules, and branding aspects to varying parties in the value chain in accordance with an embodiment of the present invention.
Figure 3:
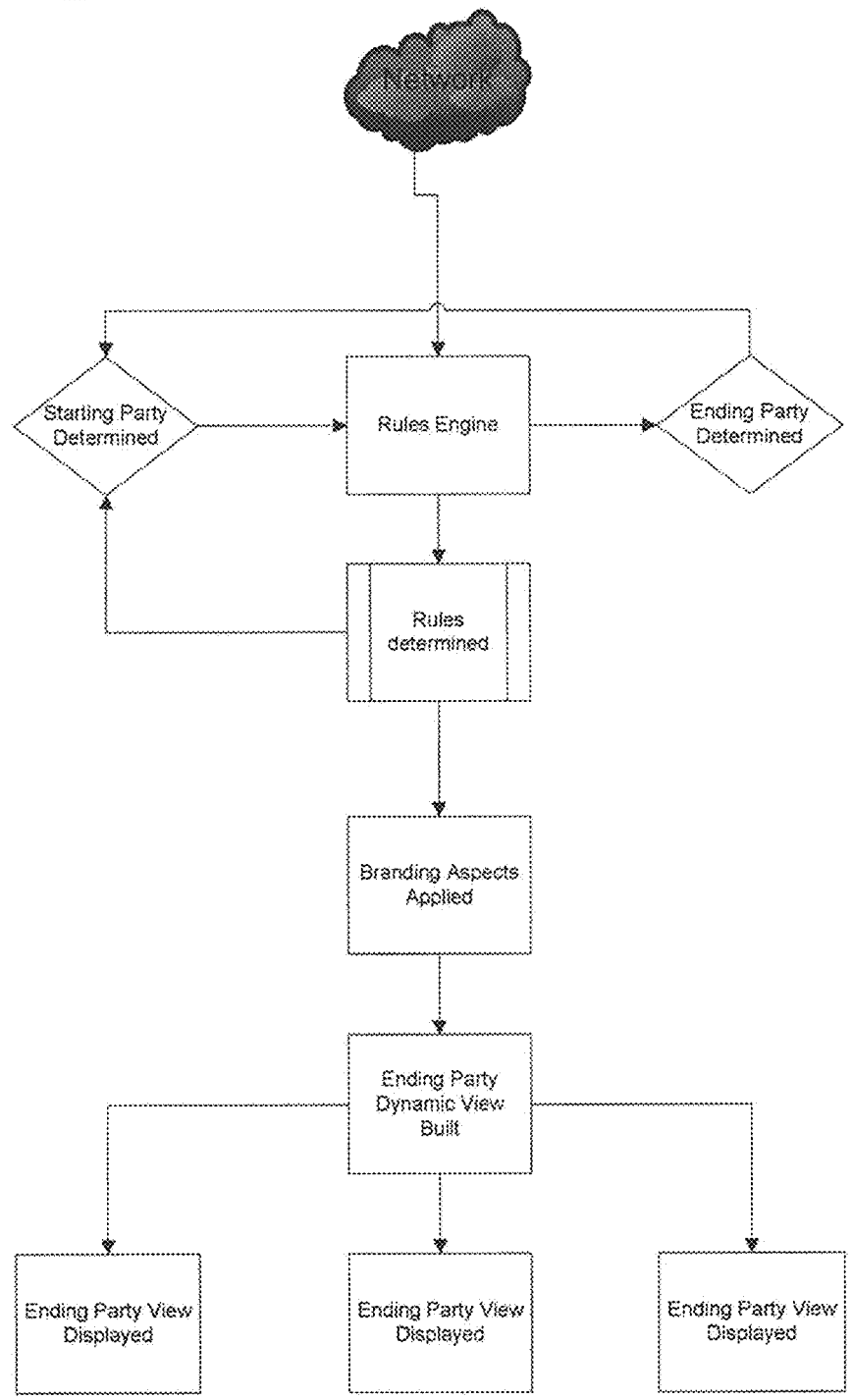
FIG. 3 is a block diagram of how associated rules are applied to the branding aspects which build the dynamic views for each starting user and end user in accordance with an embodiment of the present invention.
Figure 5:
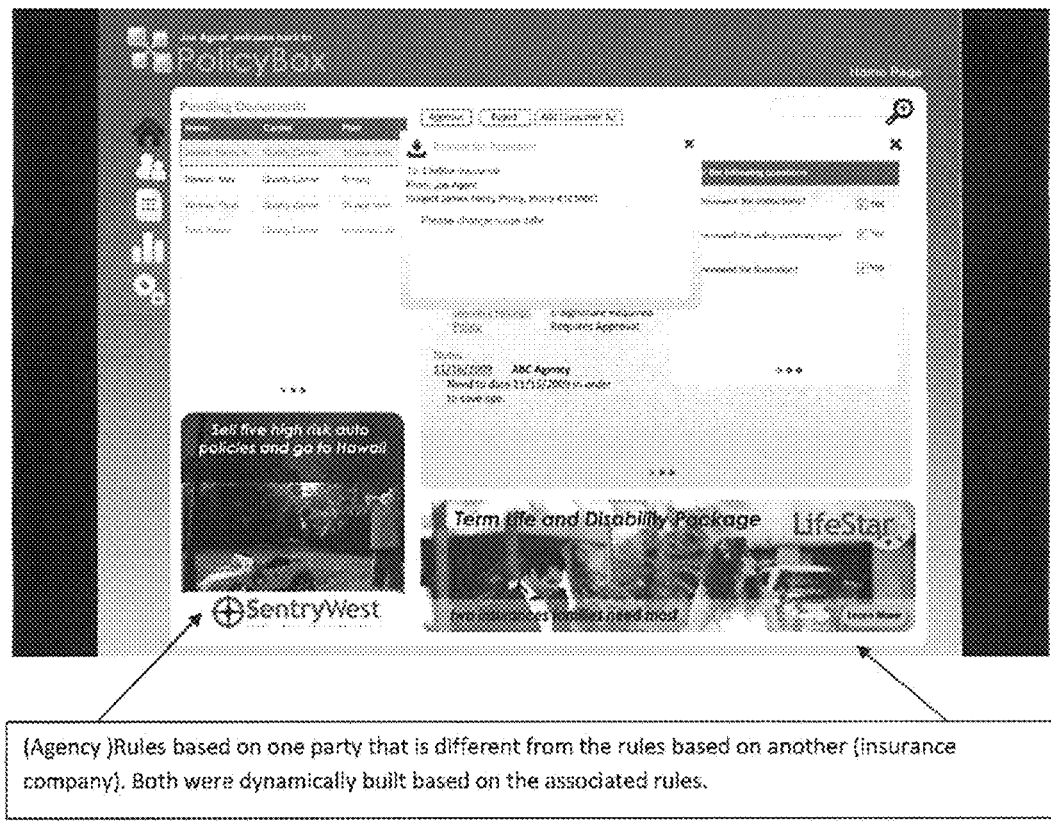

FIG. 5 illustrates a non-limiting sample view of down line the process flow of the present invention with dynamic marketing ads. Also illustrated are rules that are based on one party, such as, but not limited to, the Agency that can be preferably different from the rules based on another party, such as, but not limited to, the insurance company. The screen shot illustrates the dynamically built ads that were both built based on the specific associated rules for the party.

Figure 6:
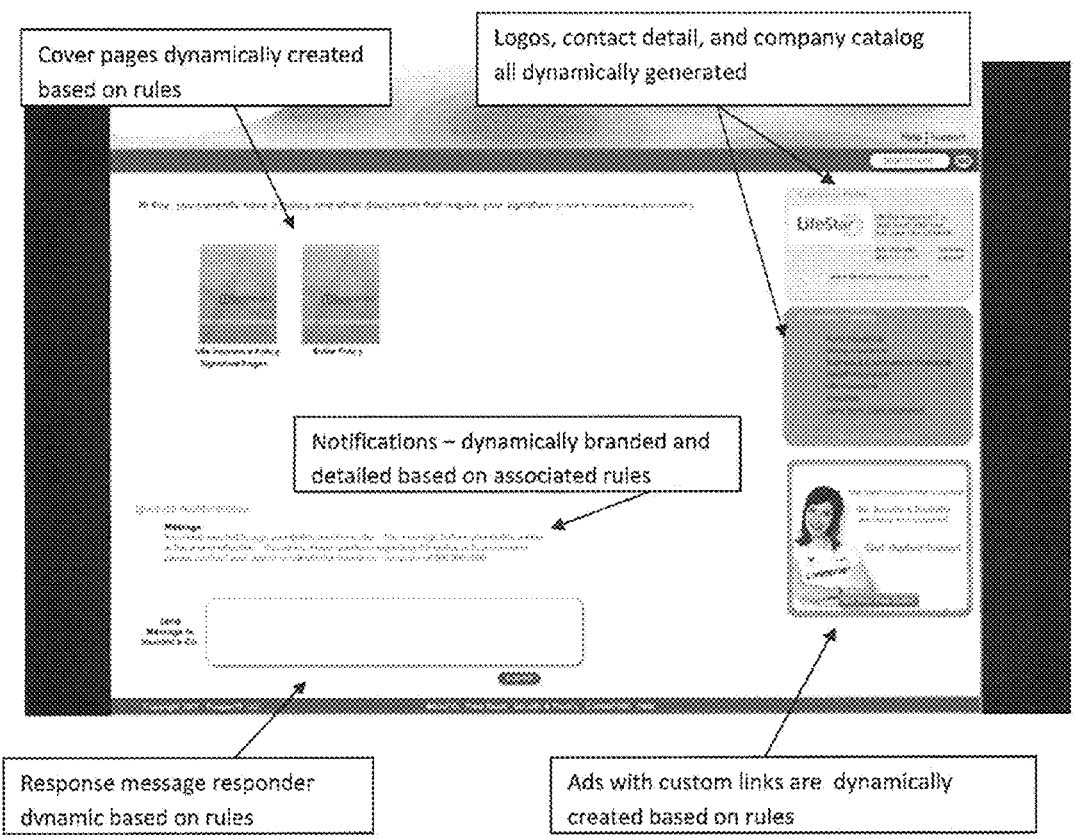

FIG. 6 illustrates a non-limiting sample consumer view of a dynamically generated screen shot based on upstream (insurance company, agency, producer) rules and branding aspects in accordance with the present invention. All variations preferably come from each party in the upstream to display a unique page view for each end consumer. As shown the cover pages can be dynamically created based on the rules. The logos, contact detail, and company catalog can be all dynamically generated. The ads with custom links can be dynamically created based on the rules. The response message responder can be dynamically created based on the rules. Lastly, the notifications can be dynamically branded and detailed based on associated rules in accordance with the present invention.

Figure 7:
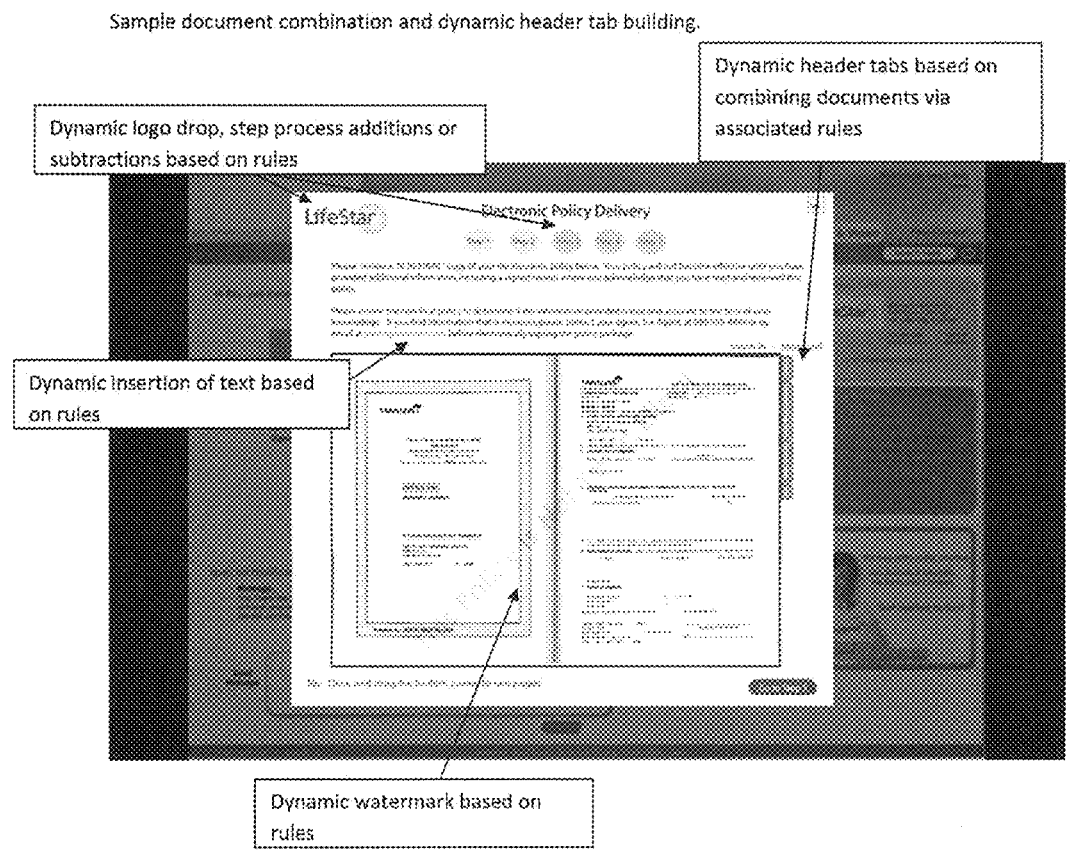
Figure 8:
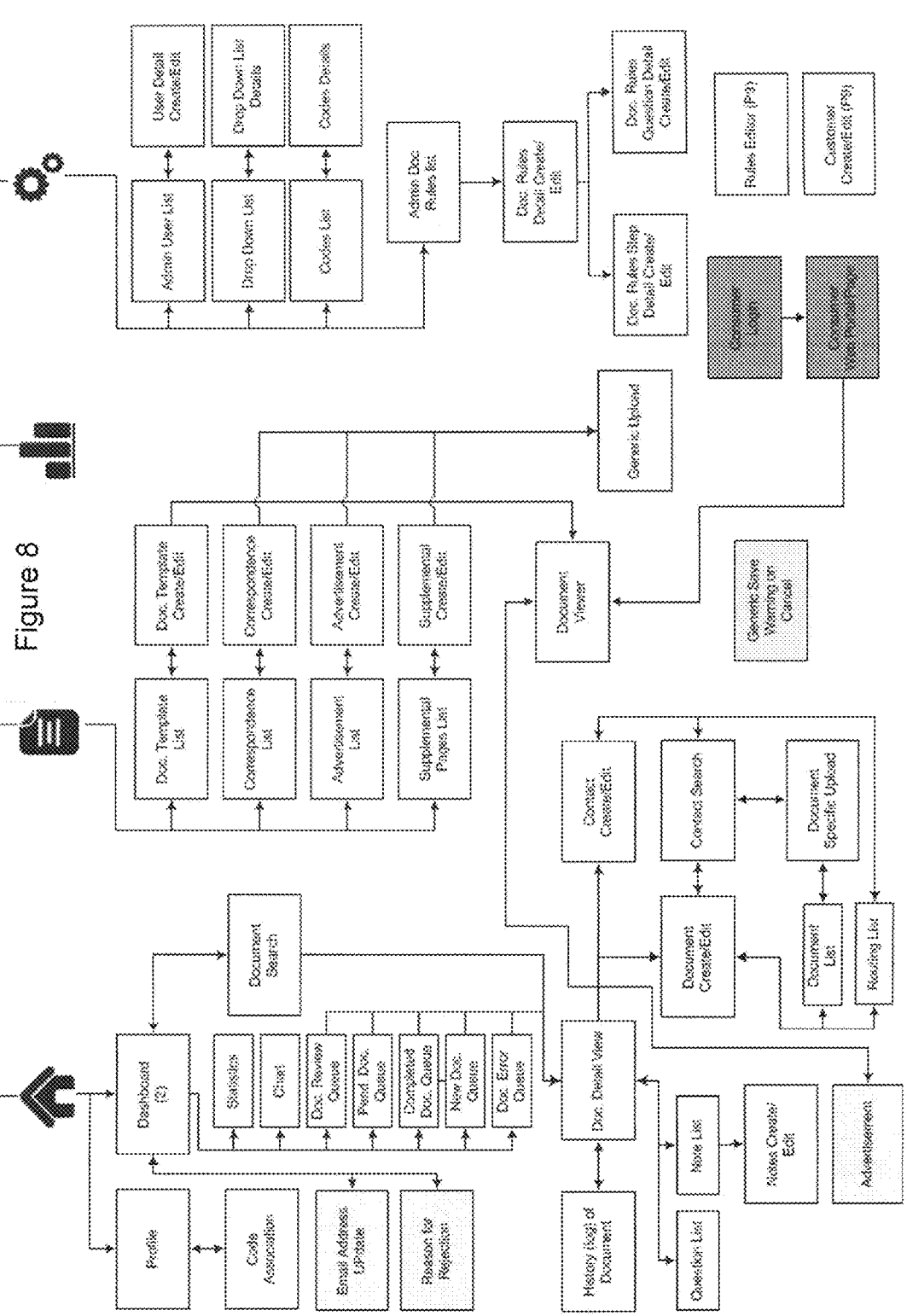
FIG. 8 is a detailed block diagram of various components of the present invention system.

FIG. 7 illustrates a non-limiting sample document combination and dynamic header tab building. As seen a dynamic logo drop can be included, step process additions Dynamic logo drop, step process additions or subtractions can all be provided based on rules in accordance with the present invention. Also seen are dynamic header tabs based on combining documents via associated rules. Further seen are a dynamic insertion of text and a dynamic watermark based on rules.

In one non-limiting example, the present invention can include a Silverlight 3.0 client application and service oriented web tier. Communication with a server can be accomplished via Windows Communication Foundation and web services over HTTPS. In this particular non-limiting example the client may run in any browser with a Silverlight 3.0 runtime plug-in. Scalability and fault-tolerance can be obtained using multiple deployments of server components. Web and application servers may be distributed as needed. Workflow services may be run in multiple processes and on multiple servers. With respect to the user interface, in one non-limiting example the present invention client application can run in a web browser with the Silverlight 3.0 runtime plug-in installed.

Though the above system and method have been described using the insurance industry as a non-limiting example, the present invention can also be used in other industries where one or more documents travel to different parties in a distribution chain and such other uses are considered within the scope of the invention.

All measurements, dimensions, amounts, ranges, values, percentages, sizes, materials, locations, configurations, components, brands, platforms, formats, operating systems, hardware, software, etc. discussed above or shown in the Figures are merely by way of example and are not considered limiting and other measurements, amounts, ranges, values, percentages, sizes, materials, locations, configurations, components, brands, platforms, formats, operating systems, hardware, software, etc. can be chosen and used and all are considered within the scope of the invention.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A method for an electronic display and review of a document by a plurality of parties in a predetermined order, said method comprising the steps of:
    (a) electronically receiving a document in an electronic format by a computer based system;
    (b) sending a first electronic notice by the computer based system to an electronic device of a first party informing the first party that the document is available for viewing and review by the first party;
    (c) using one or more previously stored templates to electronically create one or more additional documents by the computer based system; wherein the one or more additional documents contains information specifically directed to the first party from the originator of the document;
    (d) dynamically inserting the one or more additional documents in the document by the computer based system such that both the document and the one or more additional documents are displayed together when displayed to the first party;
    (e) if the first party approves the document, sending a second electronic notice by the computer based system policy system to an electronic device of a second party informing the second party that the document is available for viewing and review by the second party;
    (f) using the one or more previously stored templates or another previously stored template to electronically create one or more further additional documents by the computer based system, wherein the one or more further additional documents contains information specifically directed to the second party from the first party; and
    (g) dynamically inserting the one or more further additional documents in the document by the computer based system such that both the document and the one or more further additional documents are displayed together when displayed to the second party; wherein the dynamically inserted one or more further additional documents electronically replacing or adding to the one or more additional documents previously inserted by the computer based system.

2. The method of claim 1 further comprising the step of allowing the document to be displayed on a first electronic display of the first party when the computer based system receives proper authorization from the first party after step (b).

3. The method of claim 1 wherein the originating party is an insurance carrier and the first party is a Wholesale Agency, Broker Dealer, Broker/Producer or an insurance direct marketing organization ("Wholesale Agency or Broker"), the document is an Insurance Policy document and the additional information comprises a "thank you" letter, associated marketing materials or instructions from the insurance carrier to the Wholesale Agency or Broker.

4. The method of claim 1 wherein in step (d) a cover page for the document containing a brand, graphics, logo or other identifying text or indicia for the originator of the document is created.

5. The method of claim 1 wherein said electronic notice is an email, SMS text or other electronic message.

6. The method of claim 1 further comprising the step of electronically notifying the originator of the document by the computer based system if the document is rejected or not approved by the first party.

7. The method of claim 1 wherein the second party is an Insurance Agency, Insurance Agent or insurance direct marketing organization ("Insurance Agency"), the document is an Investment or Insurance Policy document and the further additional information is a correspondence or instructions from the first party to the Insurance Agency.

8. The method of claim 1 wherein in step (g) a cover page for the document containing the brand, graphics, logo or other identifying text or indicia for the originator of the document is replaced with a cover page containing the brand, graphics, logo or other identifying text or indicia of the first party.

9. The method of claim 1 further comprising the step of allowing the document to be displayed on a second electronic display of the second party when the computer based system receives proper authorization from the second party.

10. The method of claim 1 further comprising the step of receiving assigned routing rules from the originator of the documents by the computer based system prior to the computer based system sending the first electronic notice.

11. The method of claim 10 further comprising the step of receiving additional routing rules from the first party by the computer based system prior to the computer based system sending the second electronic notice or from the second party by the computer based system prior to the computer based system sending any further electronic notices after the sending the second electronic notice.

12. The method of claim 10 wherein the assigned routing rules creates a predetermined order for display and review of the document and any party may add, change or correct contact information for any other party down line in the predetermined order.

13. The method of claim 1 further comprising the step of receiving information from the originator of the document by the computer based system as to which party or parties are signing parties for the document.

14. The method of claim 1 further comprising the step of receiving information from the originator of the document by the computer based system as to whether the document or one or more additional documents is confidential and which parties are permitted to see the document.

15. The method of claim 1 wherein the first electronic notice provides a link or web address associated with a web portal where the first party can view the document and the one or more additional documents.

16. The method of claim 15 wherein the second electronic notice provides a link or web address for the web portal where the second party can view the document and the one or more further additional documents.

17. The method of claim 1 further comprising the step of dynamically incorporating by the computer based system a brand, graphics, logo or other identifying text or indicia for the originator of the document within the document viewed by the first party.

18. The method of claim 1 further comprising the step of dynamically incorporating by the computer based system a brand, graphics, logo or other identifying text or indicia for the first party at certain locations within the document viewed by the second party.

19. The method of claim 17 further comprising the step of dynamically replacing by the computer based system the brand, graphics, logo or other identifying text or indicia for the originator of the document with a brand, graphics, logo or other identifying text or indicia for the first party for the document viewed by the second party.

20. The method of claim 1 further comprising the step of dynamically incorporating by the computer based system a brand, graphics, logo or other identifying text or indicia for the originator of the document in the first electronic notice prior to sending the first electronic notice to the first party.

21. The method of claim 1 further comprising the step of dynamically incorporating by the computer based system a brand, graphics, logo or other identifying text or indicia for the first party in the second electronic notice prior to sending the second electronic notice to the second party.

22. The method of claim 1 wherein said document requiring a signature from at least one end recipient of such document, wherein the second party is not a signing end recipient of the document.

23. The method of claim 22 wherein the end recipient is an insured, ower or payor ("Insured") and the document is an insurance or investment policy or agreement.

24. A method for an electronic display and review of an insurance or investment document by a plurality of parties in a predetermined order, said method comprising the steps of
(a) electronically receiving an insurance or investment document of an insurance or investment company in an electronic format by a computer based system;
(b) sending a first electronic notice by the computer based system to an electronic device of a first party informing the first party that the insurance or investment document is available for viewing and review by the first party, wherein the first party is determined by the computer based system based on previously assigned routing rules;
(c) using one or more previously stored templates to electronically create one or more additional documents by the computer based system; wherein the one or more additional documents contains information specifically directed to the first party from the insurance or investment company;
(d) dynamically inserting the one or more additional documents in the insurance or investment document by the computer based system such that both the insurance or investment document and the one or more additional documents are displayed together when displayed to the first party;
(e) if the first party approves the insurance or investment document, sending a second electronic notice by the computer based system policy system to an electronic device of a second party informing the second party that the insurance or investment document is available for viewing and review by the second party, wherein the second party is determined by the computer based system based on assigned routing rules;

(f) using the one or more previously stored templates or another previously stored template to electronically create one or more further additional documents by the computer based system; wherein the one or more further additional documents contains information specifically directed to the second party from the first party;

(g) dynamically inserting the one or more further additional documents in the insurance or investment document by the computer based system such that both the insurance document and the one or more further additional documents are displayed together when displayed to the second party; wherein the dynamically inserted, one or more further additional documents electronically replacing or adding to the one or more additional documents previously inserted by the computer based system;

(h) if the second party approves the insurance or investment document, sending, a third electronic notice by the computer based system policy system to an electronic device of a third party informing the third party that the insurance or investment document is available for viewing and review by the third party, wherein the third party is determined by the computer based system based on assigned routing rules;

(i) using the one or more previously stored templates or another previously stored template to electronically create one or more other additional documents by the computer based system; wherein the one or more other additional documents contains information specifically directed to the third party from the second party;

(j) dynamically inserting the one or more other additional documents in the insurance or investment document by the computer based system such that both the insurance or investment document and the one or more other additional documents are displayed together when displayed to the third party; wherein the dynamically inserted one or more other additional documents electronically replacing or adding to the one or more additional documents or the one or more further additional documents.

25. The method of claim 24 wherein in step (d) a cover page for the insurance or investment containing, a brand, graphics, logo or other identifying text or indicia for the insurance or investment company is created.

26. The method of claim 24 further comprising the step of electronically notifying the insurance or investment company by the computer based system if the insurance or investment document is rejected or not approved by the first party.

27. The method of claim 25 wherein in step (g) the cover page for the insurance or investment document containing the brand, graphics, logo or other identifying text or indicia for the insurance or investment company is replaced with a cover page containing the brand, graphics, logo or other identifying, text or indicia of the first party.

28. The method of claim 27 wherein in step (j) the cover page for the insurance or investment document containing the brand, graphics, logo or other identifying text or indicia for the first party is replaced with a cover page containing the brand, graphics, logo or other identifying text or indicia of the second party.

29. The method of claim 24 wherein the first electronic notice provides a link or web address associated with a web portal where the first party can view the insurance document and the one or more additional documents; wherein the second electronic notice provides a link or web address for the web portal where the second party can view the insurance document and the one or more further additional documents; wherein the third electronic notice provide a link or web address for the web portal where the third party can view the insurance document and the one or more other additional documents.

30. The method of claim 24 further comprising the step of dynamically incorporating by the computer based system a brand, graphics, logo or other identifying text or indicia for the insurance or investment company within the insurance, or investment document viewed by the first party.

31. The method of claim 30 further comprising the step of dynamically replacing by the computer based system the brand, graphics, logo or other identifying text or indicia for the insurance or investment company with a brand, graphics, logo or other identifying text or indicia for the first party for the insurance or investment document viewed by the second party.

32. The method of claim 31 further comprising the step of dynamically replacing by the computer based system the bland, graphics, logo or other identifying text or indicia for the first party with a brand, graphics, logo or other identifying text or indicia for the second party for the insurance or investment document viewed by the third party.

33. The method of claim 24 further comprising the step of dynamically incorporating by the computer based system a brand, graphics, logo or other identifying text or indicia for the insurance or investment company in the first electronic notice prior to sending the first electronic notice to the first party.

34. The method of claim 24 further comprising the step of dynamically incorporating by the computer based system a brand, graphics, logo or other identifying text or indicia for the first party in the second electronic notice prior to sending the second electronic notice to the second party.

35. The method of claim 24 further comprising the step of dynamically incorporating by the computer based system a brand, graphics, logo or other identifying text or indicia for the second party in the third electronic notice prior to sending the third electronic notice to the third party.

36. A method for an electronic display and review of an insurance or investment document by a plurality of parties in a predetermined order, said method comprising the steps of
(a) electronically receiving an insurance or investment document of an insurance or investment company in an electronic format by a computer based system;
(b) sending a first electronic notice by the computer based system to an electronic device of a first party informing the first party that the insurance document is available for viewing and review by the first party;
(c) dynamically inserting by the computer based system a brand, graphics, logo or other identifying text or indicia for the insurance or investment company within the insurance or investment document viewed by the first party;
(d) if the first party approves the insurance or investment document, sending a second electronic notice by the computer based system policy system to an electronic device of a second party informing the second party that the insurance or investment document is available for viewing and review by the second party; and
(e) dynamically inserting by the computer based system as brand, graphics, logo or other identifying text or indicia for the first party within the insurance or investment document viewed by the second party which replaces or adds to the brand, graphics, logo or other indentifying text or indicia of the insurance or investment company.

37. The method of claim 36 further comprising the steps of:
(f) if the second party approves the insurance or investment document, sending a third electronic notice by the computer based system policy system to an electronic device of a third party informing the third party that the insurance or investment document is available for viewing and review by the third party; and (g) dynamically inserting by the computer based system a brand, graphics, logo or other identifying text or indicia for the second party within the insurance or investment document viewed by the third party which replaces or adds to the brand, graphics, logo or other identifying text or indicia of the insurance or investment company or the first party.

38. The method of claim 36 wherein in step (c) a cover page for the insurance or investment document containing a brand, graphics, logo or other identifying text or indicia for the insurance or investment company is created.

39. The method of claim 36 further comprising the step of electronically notifying the insurance or investment company by the computer based system if the insurance or investment document is rejected or not approved by the first party.

40. The method of claim 37 wherein in step (c) a cover page for the insurance or investment document containing a brand, graphics, logo or other identifying text or indicia for the insurance or investment company is created.

41. The method of claim 40 wherein in step (e) the cover page for the insurance or investment document containing the brand, graphics, logo or other identifying text or indicia for the Insurance Company is replaced with a cover page containing the brand, graphics, logo or other identifying text or indicia of the first party.

42. The method of claim 41 wherein in step (g) the cover page for the insurance or investment document containing the brand, graphics, logo or other identifying text or indicia for the first party is replaced with a cover page containing the brand, graphics, logo or other identifying text or indicia of the second party.

43. The method of claim 36 further comprising the step of dynamically incorporating by the computer based system a brand, graphics, logo or other identifying text or indicia for the insurance or investment company in the first electronic notice prior to sending the first electronic notice to the first party.

44. The method of claim 36 further comprising the step of dynamically incorporating by the computer based system a brand, graphics, logo or other identifying text or indicia for the first party in the second electronic notice prior to sending the second electronic notice to the second party.

45. The method of claim 37 further comprising the step of dynamically incorporating by the computer based system a brand, graphics, logo or other identifying text or indicia for the second party in the third electronic notice prior to sending the third electronic notice to the third party.

46. The method of claim 37 wherein the first electronic notice provides a link or web address associated with a web portal where the first party can view the insurance or investment document having a cover page with information, images or data identifying the insurance, or investment company; wherein the second electronic notice provides a link or web address for the web portal where the second party can view the insurance or investment document having, a cover page with information, images or data identifying the first party; wherein the third electronic notice provide a link or web address for the web portal where the third party can view the insurance or investment document having a cover page with information, images or data identifying the second party.

* * * * *